US009959285B2

(12) United States Patent
Gkoulalas-Divanis et al.

(10) Patent No.: US 9,959,285 B2
(45) Date of Patent: *May 1, 2018

(54) RESTRICTING SENSITIVE QUERY RESULTS IN INFORMATION MANAGEMENT PLATFORMS

(71) Applicant: International Business Machines Corporation, Armonk, NY (US)

(72) Inventors: Aris Gkoulalas-Divanis, Dublin (IE); Michael Wurst, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/454,808

(22) Filed: Aug. 8, 2014

(65) Prior Publication Data

US 2016/0042009 A1 Feb. 11, 2016

(51) Int. Cl.
*G06F 7/00* (2006.01)
*G06F 17/30* (2006.01)
*G06F 21/62* (2013.01)
*H04L 29/06* (2006.01)

(52) U.S. Cl.
CPC .. *G06F 17/30165* (2013.01); *G06F 17/30864* (2013.01); *G06F 21/6218* (2013.01); *G06F 21/6245* (2013.01); *H04L 63/105* (2013.01)

(58) Field of Classification Search
None
See application file for complete search history.

(56) References Cited

U.S. PATENT DOCUMENTS 7,797,725 B2 9/2010 Lunt et al.
7,810,142 B2 10/2010 Agrawal et al.
8,046,374 B1 * 10/2011 Bromwich ............ G06F 21/552
707/759

(Continued)

FOREIGN PATENT DOCUMENTS

WO 0182118 A2 11/2001
WO 2006053306 A2 5/2006

OTHER PUBLICATIONS

U.S. Appl. No. 14/684,478 entitled "Restricting Sensitive Query Results in Information Management Platforms", filed Apr. 13, 2015.

(Continued)

*Primary Examiner* — Tuan A Pham
(74) *Attorney, Agent, or Firm* — Alexander G. Jochym

(57) ABSTRACT

As information becomes more accessible to the public, the ability to predict and estimate sensitive data from the data already available to the general public becomes easier. The existing privacy-preserving data mining approaches only consider the information the user is querying and do not consider the information the user already has, and how the user can use that information in combination with the query information to create sensitive data that the user should not have access to. Some embodiments of the present invention provide a query analysis (QA) program that solves the aforementioned problem by taking into account data that a user may already have, whether it is private data or data that is available to the public, and then using that data, along with the data that would be returned in the query, to determine if sensitive data could be recreated.

5 Claims, 3 Drawing Sheets

(56) References Cited

U.S. PATENT DOCUMENTS

| | | | |
|---|---|---|---|
| 8,321,387 | B2 | 11/2012 | Dettinger et al. |
| 8,355,964 | B2 * | 1/2013 | Dema .................. G06Q 40/12 705/30 |
| 8,595,211 | B1 | 11/2013 | Satish |
| 8,627,070 | B2 | 1/2014 | Aggarwal et al. |
| 9,213,867 | B2 | 12/2015 | Ramamurthy et al. |
| 9,300,672 | B2 | 3/2016 | Bittner et al. |
| 2007/0143289 | A1 | 6/2007 | Dwork et al. |
| 2007/0226695 | A1 | 9/2007 | Krishnaprasad et al. |
| 2007/0250523 | A1 * | 10/2007 | Beers ................ G06F 17/30554 |
| 2011/0276587 | A1 | 11/2011 | Karch |
| 2012/0150841 | A1 * | 6/2012 | Ramamurthy .... G06F 17/30289 707/718 |
| 2012/0259746 | A1 | 10/2012 | Groom et al. |
| 2013/0174215 | A1 | 7/2013 | Mattsson |

OTHER PUBLICATIONS

Chen, et al., "Auditing Information Leakage for Distance Metrics", In 3rd IEEE Conference on Privacy, Security, Risk and Trust, Boston, Oct. 2011, pp. 1-10, <http://www.cs.virginia.edu/~evans/pubs/passat2011/queryauditing-packaged.pdf>.

Chin, et al., "Auditing and Inference Control in Statistical Databases", IEEE Transactions on Software Engineering, vol. SE-8, No. 6, Nov. 1982, pp. 574-582, © 1982 IEEE.

Gkoulalas-Divanis, et al., "Association Rule Hiding for Data Mining", Advances in Database Systems, vol. 41, Springer, ISBN 978-1-4419-6568-4, 2010, © Springer Science+Business Media, LLC 2010.

Lu, et al., "An Efficient Online Auditing Approach to Limit Private Data Disclosure", Proceeding EDBT '09 Proceedings of the 12th International Conference on Extending Database Technology: Advance in Database Technology, pp. 636-647, Mar. 24-26, 2009, Saint Petersburg, Russia, Copyright 2009 ACM, <http://di.acm.org/citation.cfm?id=1516434>.

Nabar, et al., "A Survey of Query Auditing Techniques for Data Privacy", Advances in Database Systems 34, Chapter 17, Springer, pp. 415-431, ISBN 978-0-387-70991-8, 2008.

Navaz, et al., "Preventing Disclosure of Sensitive Knowledge by Hiding Inference", International Journal of Computer Applications (0975-8887), vol. 63—No. 1, Feb. 2013, pp. 32-38, <http://arxiv.org/ftp/arxiv/papers/1308/1308.6744.pdf>.

Saravanabhavan, et al., "Privacy Preserving Sensitive Utility Pattern Mining", Journal of Theoretical & Applied Information Technology, Mar. 20, 2013, vol. 49, Issue 2, pp. 496-506, © 2014 EBSCO Industries, Inc., <http://web.a.ebscohostcomabstractdirect=true&profile=ehost&scope=site&authtype=crawler&jml=19928645&AN=87525990&h=Nv96EVPZ5MNrGg8%bekYibdojh0HhFGJRVhBdwa9g9YDYwntBdmFIzZXBYxCy2ZJMy28dDwiJuxMT1rSI2IZBPg%3d%3d&crl=c>.

Verykios, Vassilios S., "Association rule hiding methods", Wiley Interdisciplinary Reviews: Data Mining and Knowledge Discovery, vol. 3, Issue 1, pp. 28-36, Jan./Feb. 2013, DOI: 10.1002/widm.1082, Published Online Jan. 9, 2013, Copyright © 2013 John Wiley & Sons, Inc.

Appendix P—List of IBM Patents or Patent Applications Treated as Related, Apr. 13, 2015, 2 Pages.

* cited by examiner

RESTRICTING SENSITIVE QUERY RESULTS IN INFORMATION MANAGEMENT PLATFORMS

FIELD OF THE INVENTION

The present invention relates generally to the field of information management platforms, and more particularly to restricting queries of datasets, when the release of that data may lead to privacy violations.

BACKGROUND OF THE INVENTION

Information management platforms are widely encountered nowadays, be it in the form of open data portals or in the form of a proprietary marketplace, where individuals or companies can purchase and sell data. The wealth of information that is currently available, recently estimated in the order of zettabytes, can be combined and aggregated in unprecedented ways, leading to an increasing concern about potential privacy violations and sensitive knowledge leakage. These concerns are more important when proprietary datasets, which are typically of high quality and fine grained, are combined with externally available information sources to discover interesting knowledge patterns.

Existing research in privacy-preserving data mining, has proposed a wealth of approaches that aim at protecting sensitive knowledge exposure. These approaches can be classified along two broad directions, namely knowledge hiding and query auditing. In knowledge hiding, individual datasets are sanitized to prohibit the exposure of sensitive knowledge patterns that are usually considered in the form of frequent item sets, association rules or classification rules. Alternatively, query auditing approaches focus on modifying or restricting the results of queries in databases containing private data. These approaches operate by examining simple queries (e.g., count queries, sum queries, etc.) that were answered in the past to determine whether answers to new queries could be used by an individual to ascertain confidential information that is forbidden by pre-specified disclosure policies. Queries that could potentially cause a break of privacy are denied (not answered) or are partially answered. Similar to knowledge hiding, query auditing approaches consider a single dataset and attackers who could expose sensitive information from this data.

SUMMARY

Embodiments of the present invention include a method, computer program product, and system for controlling access to a dataset. In one embodiment, a forecasting model that forecasts a third dataset from a first dataset and second dataset is created. A forecasted dataset using the forecasting model is generated. A difference between the third dataset and the forecasted dataset is determined. The difference is compared to a pre-determined inference condition. The first dataset contains a user-requested dataset and the second dataset contains a user-known dataset.

DETAILED DESCRIPTION

Figure 1:
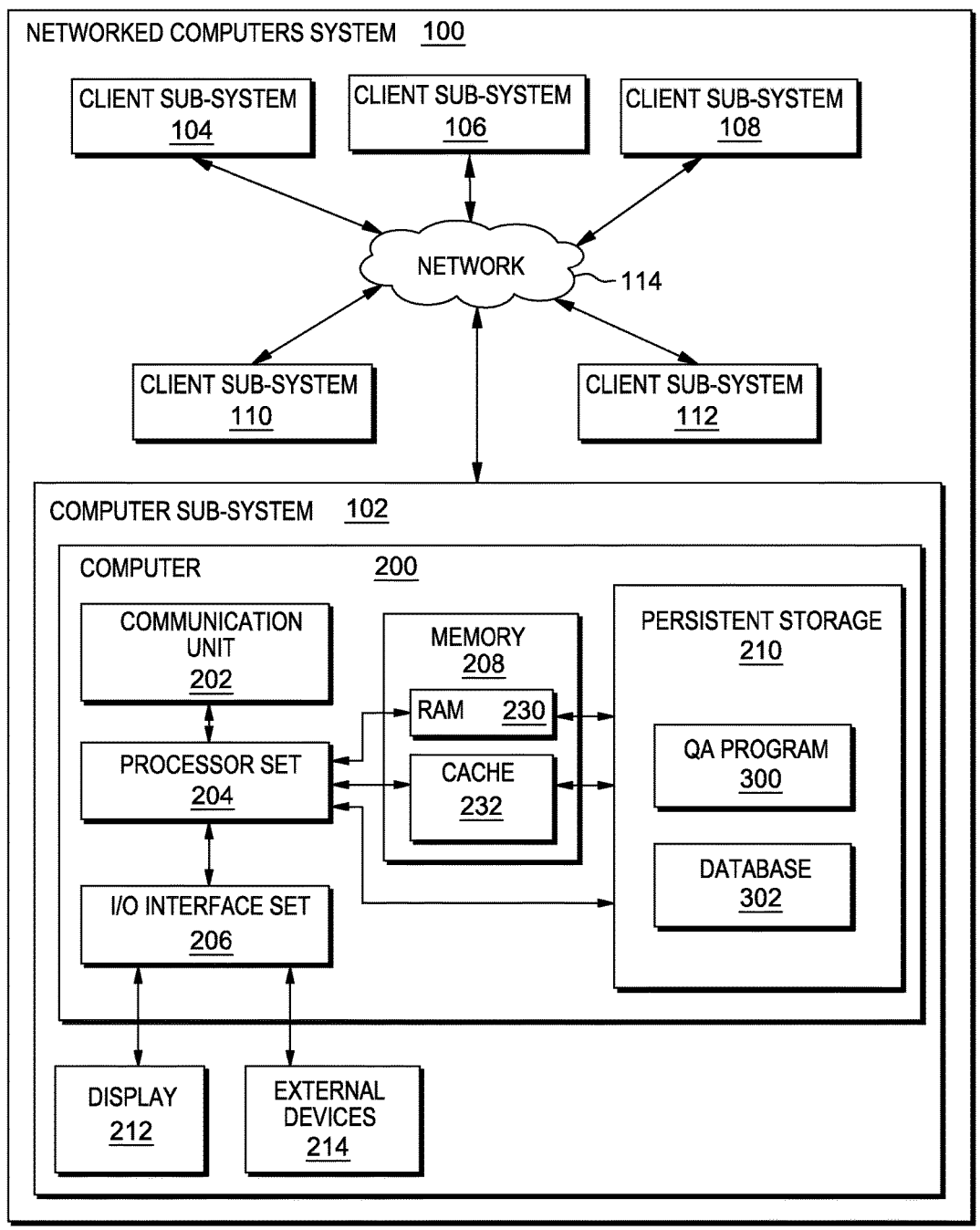
FIG. 1 is a schematic view of a first embodiment of a system according to the present invention.

As information becomes more accessible to the public, the ability to predict and estimate sensitive data from the data already available to the general public becomes easier. As stated previously, the existing privacy-preserving data mining approaches only consider the information the user is querying and do not consider the information the user already has and how the user can use that information in combination with the query information to recreate sensitive data that the user should not have access to. Some embodiments of the present invention provide a query auditor (QA) program that solves the aforementioned problem by taking into account data that a user may already have, whether it is private data or data that is available to the public, and then using that data, along with the data that would be returned in the query, to determine if sensitive data could be recreated. This avoids releasing data to a user that could be used to determine sensitive data that the user should not have.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: computer sub-system 102; client sub-systems 104, 106, 108, 110, 112; communication network 114; computer 200; communication unit 202; processor set 204; input/output (I/O) interface set 206; memory device 208; persistent storage device 210; display device 212; external device set 214; random access memory (RAM) devices 230; cache memory device 232; query auditor (QA) program 300; and database 302.

Computer sub-system 102 is, in many respects, representative of the various computer sub-system(s) in the present invention. Accordingly, several portions of sub-system 102 will now be discussed in the following paragraphs.

Computer sub-system 102 may be a laptop computer, tablet computer, netbook computer, personal computer (PC), including client sub-system(s) 104, 106, 108, 110, 112, a desktop computer, a personal digital assistant (PDA), a smart phone, or any programmable electronic device capable of communicating with the client sub-systems via network 114. QA program 300 is a collection of machine readable instructions and/or data that is used to create, manage, and control certain software functions that will be discussed in detail below.

Computer sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Computer sub-system 102 is shown as a block diagram with many double arrows. These double arrows (no separate reference numerals) represent a communications fabric, which provides communications between various components of computer sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for computer sub-system 102; and/or (ii) devices external to sub-system 102 may be able to provide memory for computer sub-system 102.

QA program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

QA program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

Database 302 resides on computer 200. In another embodiment, database 302 may reside on another device or component within networked computers system 100, accessible via network 114, such as client sub-systems 104, 106, 108, 110, 112. A database is an organized collection of data. Data found in a database is typically organized to model relevant aspects of reality in a way that supports processes requiring the information found in the database. Database 302 can be implemented with any type of storage device capable of storing data that may be accessed and utilized by computer 200, such as a database server, a hard disk drive, or a flash memory. In other embodiments, database 302 can represent multiple storage devices within computer 200. Database 302 may include data relating to a set of data that is available for query by a user, such as company sales data. Database 302 may also include results of previous queries by a plurality of users, such as a query for company sales data by a user. Database 302 may also include public data that has been searched for by QA program 300. In an embodiment, public data includes any data that is available to the public. In other words, the general public can discover or find that piece of data. For example, data from a government website, whether free or requiring a fee, may be public data. In an alternative embodiment, public data includes any data that has been shared between at least two parties. For example, confidential information shared by one party to another party but not available to the general public, may be public data.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to computer sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, QA program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

QA program 300 operates to monitor user-initiated queries, for example, via client sub-system 104, and analyze the user queries in combination with public information that the user may combine with the data supplied by the data owner in response to the query. This combination of data may lead to privacy violations of datasets that the data owner does not want to be revealed to the user. Alternatively, user queries can be made directly on computer sub-system 102. Unlike existing solutions, this embodiment does not consider only the dataset that is queried by the user, but also additional datasets that could form the background knowledge of user that supports exposure of a data owner's sensitive knowledge patterns. Sensitive knowledge patterns are those patterns that allow for inference of sensitive knowledge. Some embodiments of the present invention specify a pre-determined inference condition to support limiting the disclosure of information that may expose sensitive knowledge patterns.

Some embodiments of the present invention recognize the following facts, potential problems and/or potential areas for improvement with respect to the current state of the art: (i) conventional approaches do not consider users with background knowledge, who could combine a sanitized dataset with other datasets to uncover sensitive knowledge patterns; and/or (ii) conventional approaches assume that the data owner is able to pre-specify the dataset and specify the minimum support threshold at which the knowledge needs to be protected (such an assumption does not account for future attacks that could occur as new datasets become available).

In some embodiments of the present invention, QA program 300 receives a query from a user. The QA program 300 records the query and then analyzes the query. Analysis of the query includes identifying the type of dataset the user is requesting in the query, matching the query dataset with a knowledge base of datasets found in database 302 that are relevant to the query, uncovering additional information that the user may have, whether it be a dataset QA program 300 has already given to the user via a previous query or public information that can be found by the user, and examining the dataset that would be supplied if the query was answered in combination with the additional public information to determine if the combination of datasets can lead to privacy violations (i.e., if the query dataset and the public information can be combined to determine a dataset that the user should not have). Based upon this analysis, QA program 300 determines whether to permit or deny the query. If the query is permitted, then the corresponding query dataset is provided to the user. If the query is denied, then the user is marked as potentially malicious and the system administrator is notified. In either case, the new query and the dataset to answer the query is recorded by QA program 300 for use in the future.

In this example, the knowledge base of the system found in database 302 is periodically updated. Updates can include newly available datasets from the internet. Alternatively, newly available datasets can be public information such as tax filings or monthly, yearly, bi-yearly, etc., data released by government agencies. In yet another alternative, these newly available datasets can be any set of data that is available to the public. The auditing policy of QA program 300 is also updated accordingly, and more specifically database 302 is updated with the public information to discover privacy violations for new queries.

By analyzing the queries that are supplied by the user, QA program 300 can determine which information the user is interested in, in conjunction with the information that the user already has. The knowledge base found in database 302 helps QA program 300 to provide answers to user queries in an efficient, prompt manner, without unnecessarily delaying a response. This is due to the knowledge base of QA program 300 found in database 302 that collects, categorizes, indexes, and stores a large part of available external datasets to facilitative the easy search for relevant sources of information.

Figure 2:
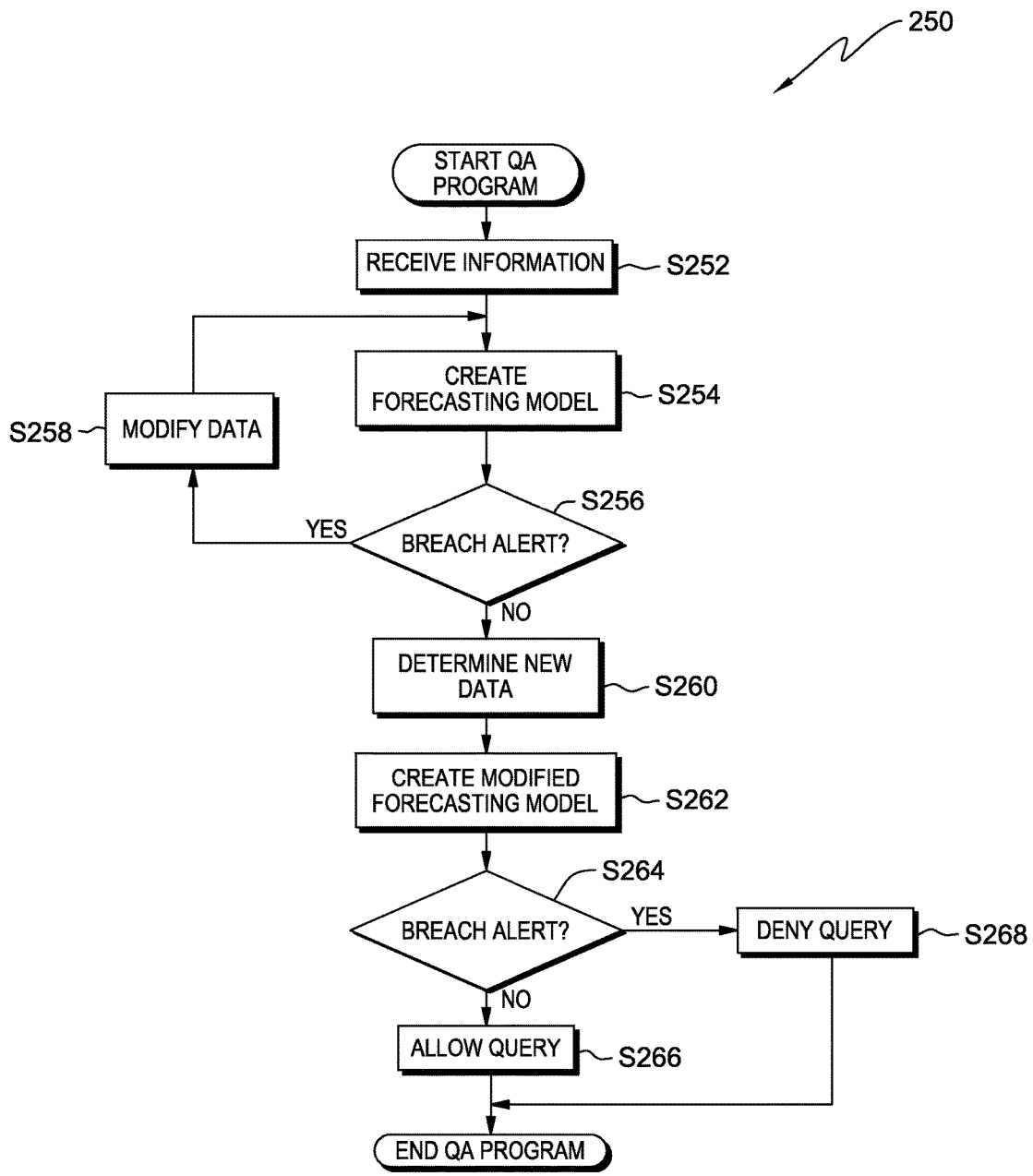
FIG. 2 is a flowchart showing a method performed, at least in part, by the first embodiment system.
Figure 3:
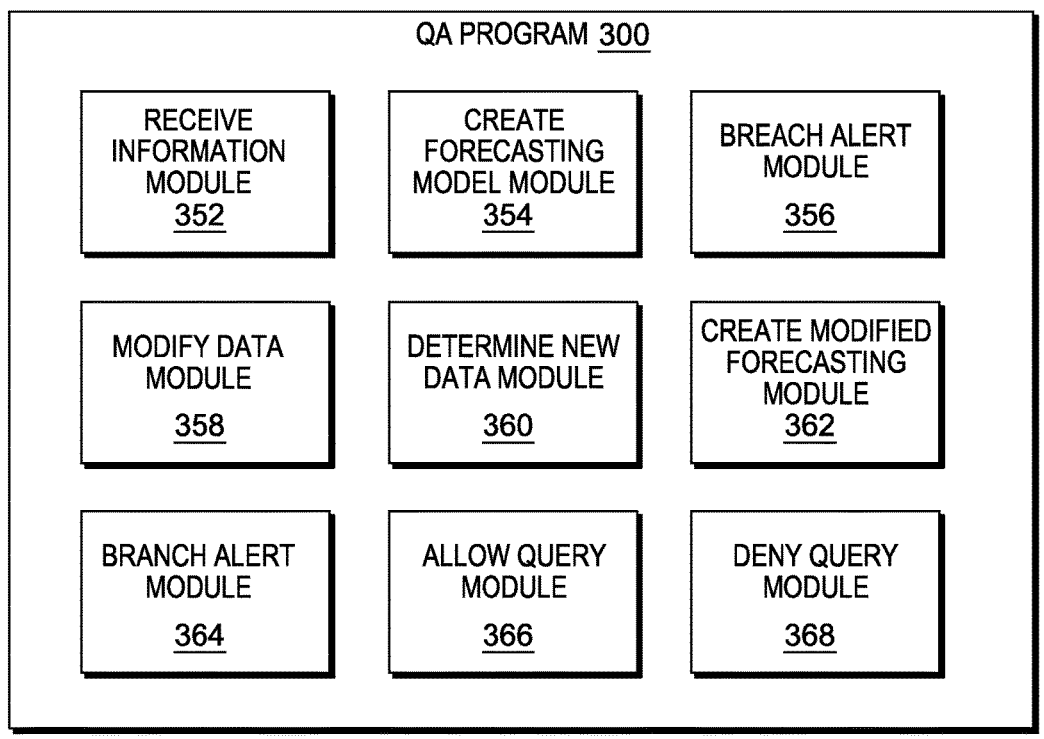
FIG. 3 is a schematic view of a machine logic portion of the first embodiment system.

FIG. 2 shows flowchart 250 depicting a first method according to the present invention. FIG. 3 shows QA program 300 for performing at least some of the method steps of flowchart 250. This method and associated software will now be discussed, over the course of the following paragraphs, with extensive reference to FIG. 2 (for the method step blocks) and FIG. 3 (for the software blocks).

QA program 300 begins when an input from a user of computer 200 is detected, indicating that the user would like to execute QA program 300. Alternatively, this step may occur after a user of client sub-system 104 indicates that the user would like to make a query and therefore the user would like to execute QA program 300. In another alternative, the data owner may initiate QA program 300 upon release of data to a plurality of users and they may query that data. In yet another alternative, the manager or administrator of an information platform, which includes a dataset to be queried, may initiate QA program 300. QA program 300 is now working with an information management platform that is associated with a dataset found in database 302.

Processing begins at step S252, where receive information module 352 receives information from a user via client sub-system 104 and also information from the data owner. Receive information module 352 receives Dataset X, Dataset Y, the user query, and a. Dataset X includes previously allowed queries by QA program 300 related to database 302. Dataset X also includes information that is available to the public. The public information may be data previously catalogued and recorded, and saved for use in this instance. Alternatively, the data may be gleamed from public sources in real-time. Dataset Y includes previously denied queries by QA program 300 related to database 302. Dataset Y also includes confidential information that a data owner has determined to be confidential, and this is the confidential information that QA program 300 is trying to keep from the user submitting the query. In an alternative embodiment, Dataset X is assigned a first access level. Dataset Y is assigned a second access level, the second access level being indicative of more sensitive data than the first access level. In other words, Dataset Y contains more sensitive information than Dataset X.

The user query is made by the user via client sub-system 104. Alternatively, the user can make the query via computer sub-system 102 directly or any device accessible to computer sub-system 102 via network 114. The query the user makes will be a request for a dataset that the user either thinks or has knowledge that the dataset is contained in database 302.

QA program 300 also receives alpha, $\alpha$, a predefined criterion, chosen by a data owner, that will indicate a threshold from which a security breach can be determined. Alpha is one example of a pre-determined inference condition. The data owner can input $\alpha$ at the time the query is made by a user. Alternatively, $\alpha$ can be indicated by the data owner at the deployment of information management platform. Each individual set of data in a dataset may have an individual $\alpha$. Alternatively, $\alpha$ may be indicated to cover all datasets in the information management platform. In another embodiment, $\alpha$ can change depending on the user making the query. A single privacy policy ($\alpha$) may be associated with a specific subject or dataset, a specific customer or user making a query, or any known or later identified organization unit or entity.

An embodiment of the present invention, through the discussion of flowchart 250, will be discussed in reference to the following example. For example, a user is the owner of company "C" and the user wants to query a dataset found in database 302 that is related to company "D". Company D is a publicly traded soda production company with only one location. In other words, the user is allowed to query QA program 300 for information the user believes may be in a database 302. Here, QA program 300 maintains the information management platform and all datasets found in database 302. For example, the query by the owner of company "C" is "What is the total monthly water consumption for Company D?" Dataset X's previously allowed queries by Company C include "What was the monthly garbage disposal of Company D?" Dataset X's public information includes the monthly water disposal via sewer for the entire town where Company D is located, monthly electrical consumption for company D, and monthly total sales for Company D. Dataset Y's previously rejected query request by Company C include "What was the monthly soda syrup consumed by Company D?" Dataset Y also includes the confidential information with respect to Company C, "The monthly soda production of Company D." Example data for each dataset is presented in Table 1 and is being provided for illustration purposes only, below:

TABLE 1

Dataset Information

| | Query: What is the total monthly water consumption for Company D? (gallons) | Dataset X, Allowed: What was the monthly garbage disposal of Company D? (lbs/month) | Dataset X, Public Information: Monthly water disposal via sewer for the entire town that Company D is located in (thousand gallons/month) | Dataset X, Public Information: Monthly electrical consumption for Company D (kW) | Dataset X, Public Information: Monthly Total Sales for Company D (hundred thousand $) | Dataset Y, Denied Query: What was the monthly soda syrup consumed by Company D (gallons) | Dataset Y, Confidential Information: The monthly soda production of Company D (thousand gallons) |
|---|---|---|---|---|---|---|---|
| January | 1438 | 348 | 48.387 | 27.488 | 3.497 | 212 | 2.132 |
| February | 1279 | 352 | 44.297 | 30.295 | 3.845 | 215 | 2.168 |
| March | 1374 | 300 | 45.288 | 31.847 | 3.394 | 200 | 2.032 |
| April | 1549 | 328 | 47.468 | 26.482 | 3.577 | 201 | 2.035 |
| May | 1279 | 375 | 43.478 | 28.850 | 3.764 | 213 | 2.145 |
| June | 1344 | 350 | 41.855 | 27.943 | 3.422 | 211 | 2.127 |
| July | 1399 | 280 | 47.812 | 29.843 | 3.985 | 208 | 2.091 |
| August | 1258 | 351 | 46.397 | 29.456 | 3.855 | 206 | 2.085 |
| September | 1284 | 358 | 47.485 | 28.577 | 3.647 | 215 | 2.177 |
| October | 1347 | 327 | 48.954 | 27.674 | 3.576 | 214 | 2.154 |
| November | 1399 | 334 | 46.847 | 31.842 | 3.722 | 205 | 2.076 |
| December | 1288 | 351 | 46.889 | 32.779 | 3.648 | 199 | 2.002 |

Processing proceeds to step S254, where create forecasting model module 254 creates a forecasting model, Y, from dataset X and the dataset that would be supplied if QA program 300 were to supply a response to the user query from S252. Create forecasting model module 254 also determines the difference between dataset Y, the dataset that is the confidential information that QA program 300 is attempting to restrict user access to, and Y=f(X). The forecasting model creates a value of Y for a plurality of time values. The forecasting model can be built using any kind of forecasting or regression algorithm, e.g., regression trees. For example, regression analysis may include linear regression, simple regression, ordinary least squares, polynomial regression, general linear model, generalized linear model, discrete choice, logistic regression, multinominal logit, mixed logit, probit, multinominal probit, ordered logit, ordered probit, poisson, multilevel model, fixed effects, random effects, mixed model, nonlinear regression, nonparametric, semiparametric, robust, quantile, isotonic, principal components, least angle, local, segmented, and errors-in-variables. In an alternative embodiment, forecasting models may include moving average, weighted moving average, kalman filtering, exponential smoothing, autoregressive moving average, autoregressive integrated moving average, extrapolation, linear prediction, trend estimation, growth curve, and autoregressive moving average with exogeneous inputs. In another alternative embodiment, the forecasting model can be any model suitable for the foregoing intended use as known in the art.

After the creation of the forecasting model, create forecasting model module 254 determines the differences between dataset Y and Y=f(x), and then determines the average of the absolute value of those differences. Diff(Y) will be a plurality of differences between Y and f(X), each of those differences determined for a separate time period or point in time. Each point will be a different point in time. For example, if the dataset was monthly and there was a year's worth of data, then there would be twelve datasets for Y and twelve datasets for f(X), and therefore twelve diff(Y) datasets. Alternatively, the dataset could be a yearly dataset and any number of years could be analyzed. In another example, the dataset could be a monthly dataset and twenty eight, twenty nine, thirty, or thirty one days could be analyzed. In this example, the diff(Y) is calculated in an absolute value, in that way, the value of diff(Y) is positive. The absolute value of a real number is the non-negative value of the number without regard for the sign of the number. Alternatively, the diff(Y) is a difference value that is either positive or negative, depending on the input. Example data for each dataset and the forecasting model is presented in Table 2 and is being provided for illustration purposes only, below:

TABLE 2

Dataset Y and Forecasting Model

| | Dataset Y, Confidential Information: The monthly soda production of Company D (thousand gallons) | Forecasting Model Y= f(X) (thousand gallons) | Absolute Value of Difference |
|---|---|---|---|
| January | 2.132 | 2.675 | 0.543 |
| February | 2.168 | 2.566 | 0.398 |
| March | 2.032 | 1.783 | 0.249 |
| April | 2.035 | 1.899 | 0.136 |
| May | 2.145 | 2.847 | 0.702 |
| June | 2.127 | 2.499 | 0.372 |
| July | 2.091 | 2.211 | 0.120 |
| August | 2.085 | 2.574 | 0.489 |
| September | 2.177 | 1.789 | 0.388 |
| October | 2.154 | 1.884 | 0.270 |
| November | 2.076 | 1.933 | 0.143 |
| December | 2.002 | 2.577 | 0.575 |
| Alpha (α): | 0.30 | Average Difference: | 0.3654 |

For example, the data found in the third column is created by forecasting model Y=f(X). The forecasting model predicts the value of Y, the confidential information from Table 1, based upon Dataset X, the previously allowed query and the three columns of public information, and the second column, the information that would be released by QA program 300 if an answer to the user query were to be provided.

Processing proceeds to decision block S256, where breach alert module 356 determines if the average diff(Y), determined in S254, is greater or less than α, received in S252. In this embodiment, QA program 300 determines if the average difference of all the diff(Y) found in step 254 exceeds α.

If avgdiff(Y)<α (decision block S256, yes branch), then breach alert module 356 notifies a data owner of a potential breach in security, if the dataset that responds to the user's query were to be released. In an embodiment, breach alert module 356 notifies the data owner that, if the dataset in response to the query were to be released, the user that made the request could potentially determine confidential information from that dataset and other public information available to the user. The data owner may then review the dataset and may also determine a part or subset of the dataset that is specifically causing the breach alert. In other words, is there a specific part of the dataset, in combination with publicly available data, which allows a user to predict dataset Y, the confidential data that the information management platform is protecting from the user. Alternatively, QA program 300 may perform this step directly, without the need of the data owner. If avgdiff(Y)<α (decision block S256, yes branch), then processing proceeds to step S258. If avgdiff(Y)>α (decision block S256, no branch), then processing proceeds to step S260.

For example, using the datasets from Table 1 and Table 2, discussed previously, the avgdiff(Y)>α, 0.3654>0.30, therefore processing will proceed to step S260 and there will be no breach alert. In other words, the data owner will not be notified of the query. Alternatively, if avgdiff(Y)<α, processing would proceed to step S258 and there will be a breach alert. In other words, the data owner will be notified of the potentially malicious query and will be given options on how to handle the query.

In response to avgdiff(Y)<α (decision block S256, yes branch), processing proceeds to step S258, where modify data module 358 removes a piece of the dataset that would be returned in response to the user's query in step S252. In this embodiment, columns, rows, or other subsets of the dataset that would be returned in response to the query would be removed. In an embodiment, the removal of a subset of data from the dataset is done such that meeting the pre-determine inference condition no longer exists. The data owner may make the decision, after reviewing the dataset, as to what piece of the dataset to remove. Alternatively, modify data module 358 may determine which piece of the dataset to remove based upon which parts of the dataset create a correlation between the forecasting model Y=f(X), as determined in step S254, and dataset Y, the information that the manager or administrators wants to remain confidential. Upon completion of step S258, processing returns to step S254 where the forecasting model is recreated using the modified dataset that would respond to the user query.

For example, if the dataset that would be provided in response to the user query included a plurality of columns of data, the data owner chooses to remove one or more of the plurality of columns of data. The data owner may choose which data to remove at random. Alternatively, the data owner may choose data to remove based on the likelihood that the specific piece of data may lead to a more accurate forecasting model as compared to Dataset Y's confidential information that is trying to be protected. After data modification, the forecasting model is recreated.

In response to avgdiff(Y)>α (decision block S256, no branch), processing proceeds to step S260, where determine new data module 360 uses at least one of a plurality of web crawlers, an internet bot that systematically browses the Internet typically for the purpose of web indexing, to search for dataset Z. Dataset Z is public information that is available from an external, public source. Additionally, dataset Z is pieces of information or data that, when used in conjunction with Dataset X, would create a more accurate forecasting model Y=f(X). In other words, is there any other public data, dataset Z, that is available that can create a forecasting model that is more similar or closer to dataset Y, the confidential information that the information management platform is trying to protect. Example data for the dataset is presented in Table 3 and is being provided for illustration purposes only, below:

TABLE 3

| Dataset Z | |
|---|---|
| Dataset Z, Public Information: Monthly water disposal via sewer for Company D (thousand gallons/month) | |
| January | 2.147 |
| February | 2.223 |
| March | 2.089 |
| April | 1.999 |
| May | 2.541 |
| June | 2.327 |
| July | 2.109 |
| August | 1.875 |
| September | 2.244 |
| October | 2.037 |
| November | 2.044 |
| December | 2.500 |

For example, the web crawler has searched public records and been able to find information related to Company D. The information found relates to monthly water disposal via sewer for Company D. In this example, this information was scraped from city records. This information will allow for the creation of a modified forecasting model.

Processing proceeds to step S262, where create modified forecasting model module 362 creates a new forecasting model, Y', from dataset X, dataset Z, and the dataset that would be supplied if QA program 300 were to supply a response to the user query from S252. The forecasting model may create a value of Y' for a number of time values. Create modified forecasting model module 362 also determines the difference between dataset Y, the dataset that is the confidential information that QA program 300 is attempting to restrict user access to, and Y=f(X). Similar to step S254, the forecasting model can be built using any kind of forecasting or regression algorithm, e.g., regression trees. For example, regression analysis may include linear regression, simple regression, ordinary least squares, polynomial regression, general linear model, generalized linear model, discrete choice, logistic regression, multinominal logit, mixed logit, probit, multinominal probit, ordered logit, ordered probit, poisson, multilevel model, fixed effects, random effects, mixed model, nonlinear regression, nonparametric, semi-parametric, robust, quantile, isotonic, principal components, least angle, local, segmented, and errors-in-variables. In an alternative embodiment, forecasting models may include moving average, weighted moving average, kalman filtering, exponential smoothing, autoregressive moving average, autoregressive integrated moving average, extrapolation, linear prediction, trend estimation, growth curve, and autoregressive moving average with exogeneous inputs. In another alternative embodiment, the forecasting model can be any model suitable for the foregoing intended use as known in the art.

After the creation of the forecasting model, create modified forecasting model module 362 determines the differences between dataset Y, the dataset that is the confidential information that information management platform is attempting to restrict user access to, and f'(X u Z), the modified forecasting model. Diff'(Y') will be a plurality of differences between Y and f(X u Z). Each point will be a different point in time. For example, if the dataset was monthly and there was a year's worth of data, then there would be twelve datasets for Y and twelve datasets for f(X u Z), and therefore twelve diff'(Y') datasets. Alternatively, the dataset could be a yearly dataset and any number of years could be analyzed. In another example, the dataset could be a monthly dataset and twenty eight, twenty nine, thirty, or thirty one days could be analyzed. The diff'(Y') will always be calculated in an absolute value. In other words the value of diff'(Y') will always be positive. The absolute value of a real number is the non-negative value of the number without regard for the sign of the number. Example data for each dataset and the modified forecasting model is presented in Table 4 and is being provided for illustration purposes only, below:

TABLE 4

Dataset Y and Modified Forecasting Model

| | Dataset Y, Confidential Information: The monthly soda production of Company D (thousand gallons) | Modified Forecasting Model Y' = f(X) (thousand gallons) | Absolute Value of Difference |
|---|---|---|---|
| January | 2.132 | 2.449 | 0.317 |
| February | 2.168 | 2.346 | 0.178 |
| March | 2.032 | 1.889 | 0.143 |
| April | 2.035 | 1.837 | 0.198 |
| May | 2.145 | 2.611 | 0.466 |
| June | 2.127 | 2.422 | 0.295 |
| July | 2.091 | 2.217 | 0.126 |
| August | 2.085 | 2.483 | 0.398 |
| September | 2.177 | 1.856 | 0.321 |
| October | 2.154 | 1.947 | 0.207 |
| November | 2.076 | 1.973 | 0.103 |
| December | 2.002 | 2.438 | 0.436 |
| Alpha ($\alpha$): | 0.30 | Average Difference: | 0.2657 |

For example, the data found in the third column is created by forecasting model Y=f'(X u Z). The modified forecasting model predicts the value of Y, the confidential information from Table 1, based upon Dataset X, the previously allowed query and the three columns of public information, Dataset Z, and the second column, the information that would be released by QA program 300 if an answer to the user query were to be provided.

Processing proceeds to decision block S264, where breach alert module 364 determines if avgdiff'(Y'), the average of the diff'(Y'), determined in S262, is greater or less than $\alpha$, received in S252. In this embodiment, QA program 300 determines if the average difference of all the diff'(Y') found in step 226 exceeds $\alpha$. Here, $\alpha$ is the same value as supplied in step S252. In an alternative embodiment, the data owner of information platform may provide a different value for $\alpha$ than used previously. In yet another embodiment, QA program 300 may determine a new $\alpha$ that is dependent of $\alpha$ from step S252. For example, if $\alpha$ was determined to be 0.3 in step S252, $\alpha$ may become 90% of that value or 0.27, causing breach alerts to trigger at a higher value and therefore creating breach alerts for more accurate models. In other words, the comparison between avgdiff'(Y') and $\alpha$ is now more stringent. If avgdiff'(Y')<$\alpha$ (decision block S264, yes branch), then processing proceeds to step S268. If avgdiff'(Y')>$\alpha$ (decision block S264, no branch), then processing proceeds to step S266.

For example, using the datasets from Table 1, Table 2, and Table 3, discussed previously, the avgdiff'(Y')>$\alpha$, 0.2657<0.30, therefore processing will proceed to step S268 and there will be no breach alert. In other words, the data owner will be notified of the query, the query will be denied to the user and the dataset that would be provided in response to the query is added to Dataset Y. Alternatively, if avgdiff(Y)>$\alpha$, processing would proceed to step S266, there will be no breach alert and the user would be provided with the dataset that would respond to their query.

In response to avgdiff'(Y')>$\alpha$ (decision block S264, no branch), processing proceeds to step S266, where allow query module 366 allows the query by the user. In other words, QA program 300 provides the dataset to the user that would respond to the query from user received in step S252. The QA program 300 has determined that the dataset given to the user in response to the query, in combination with dataset X, cannot currently predict dataset Y, the confidential information QA program 300 is trying to protect from the user. Processing proceeds to end QA program 300. In other words, the QA program has finished handling all queries, for example, as specified by the data owner that the data is now not available for any user to query. All work has been completed by QA program 300. In an alternative embodiment, processing may return to step S208, and the user may make a new query.

In response to avgdiff'(Y')<$\alpha$ (decision block S264, yes branch), processing proceeds to S268, where deny query module 368, similar to breach alert module 356, notifies a data owner of a potential breach in security if the dataset that responds to the user's query were to be released to the user. For example, the data owner may receive a notification stating at least one of the dataset that would respond to the query, the query, the user that made the query, and the action that QA program 300 is going to take, i.e. deny the query. Alternatively, the data owner may review the dataset that would be provided to the user in response to their query and make the final determination as to whether to release the dataset to the user.

In addition, deny query module 368 denies the query of the user that is provided in step S252. The deny query module 368 notifies the user that the query is denied. In an embodiment, the user may be denied the query with no further explanation. In an alternative embodiment, the user may be denied the query and the denial may include comments or remarks from the data owner regarding the denial.

In addition, deny query module 368 adds the dataset that would be provided in response to the query made by the user in step S252 to dataset Y. In other words, the dataset that would be provided in response to the query by the user is added to dataset Y and is now included in confidential information. Here, the dataset that would have been provided in response to the query by the user is now restricted from all users and will not be released to a user in response to a query.

An alternative embodiment of the present invention will be discussed further in reference to the following example. A user is a shareholder of a company "X" and the user wants to purchase two datasets from the information management platform that the user is a member of and QA program 300 manages. The user queries the information management platform for: (a) the production statistics of company "Y", and (b) a dataset containing aggregate energy meter readings from different areas in a city. Here, QA program 300 maintains the information management platform and all datasets found on the information management platform.

Here, the user may submit a query about (a) the production statistics of company "Y" to QA program 300. This query would be denied by QA program 300 because the user is not authorized to obtain that sensitive economic data. However, the fact that the user asked for this query reveals that he or she is interested in this information and the QA program 300 records that in database 302. Additionally, the user may submit a query about (b) a dataset containing aggregate energy meter readings for different areas in a city and this query, along with the corresponding dataset that would be released to the user to answer the query, is first analyzed in terms of traditional query auditing methods, knowledge hiding and query auditing as discussed previously, and it would be determined that this dataset would not reveal anything on any of the classified confidential datasets that QA program 300 is trying to protect in information management platform.

Additionally, QA program 300 will go a step further to analyze what dataset or piece of information would be missing, which would enable the user to go from the dataset that would result from query (b) that is potentially going to be allowed to the dataset that would result from query (a) that was not allowed. Here, this could reveal a time series that the difference between the production statistics (query a) and the energy consumption (query b) follows a pattern. QA program 300 then searches through the knowledge base on dataset 302 and public data or other platforms to find data with a similar shape. In this case, the resulting series may resemble wind speed data in the area, which is publically available. Thus, the user might be able to infer the production statistics (query a) by combining the energy consumption (query b) with the publically available wind speed data in the area due to the fact that company "Y" uses its own wind generation.

Based on these results, two events can occur. First, the user can be blocked from similar types of queries. Second, the energy consumption data from the area can be further transformed, edited, or restricted as not to allow that type of inferences of sensitive data in the future. Another, similar type of scenario, may involve, instead of energy consumption (query b) it may be water consumption (query c) and that water consumption is used heavily in the manufacturing process of a company. In this example, a user may be interested in determining if the production of a company has recently decreased and, to determine this, the user may try to purchase and query datasets that relate to water consumption of the company.

What is claimed is:

1. A method for controlling access to a dataset, the method comprising:
   receiving, by one or more computer hardware processors, a request for a first dataset from a user, wherein the first dataset includes one or more first dataset values;
   creating, by one or more computer hardware processors, a forecasting model using regression analysis from the first dataset and a second dataset, wherein the second dataset includes one or more second dataset values, and wherein each second dataset value of the one or more second dataset values corresponds to each first dataset value of the one or more first dataset values;
   generating, by one or more computer hardware processors, a forecasted dataset using the forecasting model, wherein the forecasted dataset includes one or more forecasted dataset values, and wherein each forecasted dataset value of the one or more forecasted dataset values is forecasted using each corresponding first dataset value and second dataset value;
   determining, by one or more computer hardware processors, a difference between values in a third dataset and values in the forecasted dataset for each corresponding third dataset value and forecasted dataset value, wherein the third dataset includes one or more third dataset values, and wherein each third dataset value of the one or more third dataset values corresponds to a forecasted dataset value of the one or more forecasted dataset values; and
   comparing, by one or more computer hardware processors, the average of the absolute value of all of the difference to a pre-determined inference condition;
   wherein:
   the first dataset contains a user-requested dataset; and
   the second dataset contains a user-known dataset.

2. The method of claim 1, wherein:
   the first dataset is assigned a first access level; and
   the third dataset is assigned a second access level, the second access level indicating sensitive data with respect to the first access level.

3. The method of claim 1, further comprising:
   responsive to the average of the absolute value of all of the difference meeting the pre-determined inference condition, denying, by one or more computer hardware processors, the request for the first dataset.

4. The method of claim 1, wherein the second dataset includes public data identified in a web crawling process.

5. The method of claim 1, further comprising:
   responsive to the average of the absolute value of all of the difference not meeting the pre-determined inference condition, providing, by one or more, the request for the first dataset to the user.

* * * * *